United States Patent Office 3,323,862
Patented June 6, 1967

3,323,862
CORROSION INHIBITION
Charles William Lutz, Clark, William A. Tidridge, Fanwood, and Raimond Pals, Farmingdale, N.J., assignors to FMC Corporation, New York, N.Y., a corporation of Delaware
No Drawing. Filed June 25, 1963, Ser. No. 290,339
11 Claims. (Cl. 23—106)

This invention relates to corrosion inhibition, and particularly to phosphorus-containing compositions which are inhibited against corrosion of mild steel and are stable against separation of components.

Concentrated aqueous phosphoric acid, having a concentration of about 60 to 85 weight percent of the acid, is widely used as a source of phosphorus in fertilizers and various other applications such as modification of ensilage for animal feeds. In fertilizer use, it is employed in this highly concentrated form either directly or after neutralization with ammonia or other nitrogen-containing compounds to produce neutralized aqueous solutions such as the 8–24 mixture (containing 8 weight percent nitrogen and 24 weight percent phosphorus as $P_2O_5$) and the corresponding 7–21, 15–15 and 10–20 mixtures.

The use of concentrated phosphoric acid has had a serious drawback, however. It is corrosive to inexpensive mild steel equipment which desirably would be employed in storing and shipping it, as well as in formulating and using the concentrated acid such as in neutralization with ammonia to provide the 8–24 and related fertilizers referred to above. Accordingly, in the past it has been necessary to formulate, store and use concentrated phosphoric acid in expensive equipment formed of corrosion-resistant materials such as stainless steel or mild steel lined with rubbers or plastics resistant to the acid.

Much research has been devoted to development of inhibitors for use with concentrated phosphoric acid and with liquid fertilizers prepared therefrom, in an attempt to overcome the problem of corrosion. Despite this effort, however, very little has been achieved in the way of developing inhibitors which both inhibit the attach of concentrated aqueous phosphoric acid or aqueous ammonium phosphate fertilizers on mild steel, and at the same time remain in solution in the concentrated acid and aqueous ammonium phosphate fertilizers where it will be available at all times to effect the necessary inhibition. One problem which occurs with most inhibitors developed heretofore is separation of certain portions of the inhibitor from the solution, a separation which causes gummy deposits to clog equipment and coat tank walls and the like in storage and use.

It therefore is a feature of this invention to provide an inhibitor which substantially reduces the attack of concentrated aqueous phosphoric acid solutions, and ammonium phosphate aqueous solutions prepared therefrom, on mild steel.

It is a further feature to provide such an inhibitor having a high degree of compatibility in the indicated systems such that an effective concentration of the inhibitor remains in solution to carry out its function, and does not separate and create problems such as clogging of equipment, coating of walls and conveyors and the like.

It has now been discovered that mixtures of alkyl trimethyl ammonium chlorides with dialkyl dimethyl ammonium chlorides, in which the alkyl groups have 8 to 18 carbon atoms and preferably 10 to 14 carbon atoms, are particularly effective inhibitors against corrosion of mild steel by concentrated, phosphorus-containing, aqueous solutions of concentrated phosphoric acid and ammonium phosphate, and are compatible with these solutions, when these mixtures are employed in a total concentration above about 0.08 weight percent in the aqueous solutions, and in a weight ratio of the dialkyl dimethyl ammonium chloride to the alkyl trimethyl ammonium chloride of between about 1:3 and 3:1.

Quite surprisingly, these specific mixtures exhibit a considerably better inhibiting effect against corrosion of mild steel both under static and dynamic testing conditions, than do either of the components alone when these components are used in amounts equal to the additive amount of the two in the mixture. At the same time, the herein mixtures have strikingly good compatibility with the concentrated phosphoric acid and with the aqueous ammonium phosphates prepared therefrom when employed in a total amount of up to about 0.25%, and preferably about 0.15%, by weight of the solution. Use or more than these amounts of the synergistic mixture provides excelent corrosion inhibition, but occasionally causes deposition of some of the inhibiting ingredient.

The phosphorus-containing solutions treated with the herein inhibitors are aqueous concentrated phosphoric acid solutions having concentrations of about 60 to 85 weight percent, and commonly about 75 weight percent, and aqueous ammonium phosphate solutions. The latter typically are the 8–24 and related mixtures utilized as liquid fertilizers; they normally are used at concentrations in aqueous solution near their maximum solubilities, namely at about 20 to 40 percent by weight of the total solution.

The concentrated phosphoric acid provides a particular problem in its effect on mild steel. Phosphoric acid of lower concentrations, normally about 10 to 30 percent, is employed in pickling solutions and the like because of its highly corrosive effect on steel. Selection of additives for the low concentration phosphoric acid solutions is primarily based on the ability of the additives to provide selective attack on iron oxide, impurities therein and the like.

An entirely different problem exists in developing inhibitors for concentrated phosphoric acid solutions; in this case the solutions are not highly corrosive when compared with the lower concentration solutions, and they are not used for the purpose of attacking metals or coatings thereon. Rather, they are employed for other purposes, particularly fertilizer use, and their attack on mild steel must be reduced to a minimum. Additives for the concentrated acid therefor must be selected on an entirely different basis than that on which additives are selected for used with low concentration acid.

Neutralized phosphoric acid fertilizer compositions prepared from concentrated phosphoric acid may contain various mixtures of monoammonium phosphate, diammonium phosphate, ammonium nitrate, ammonium sulfate, urea, potassium chloride, potassium nitrate, and the like and other common fertilizer additives. They are formed by reaction of anhydrous ammonia, aqua ammonia and other nitrogen sources with concentrated phosphoric acid. The mixtures are blended in any desired fashion to provide the fertilizer having the desired concentration of nitrogen and phosphorus, and if desired, other additives.

The most corrosive of the herein phosphorus-containing solutions in their effect on mild steel is concentrated phosphoric acid. Accordingly, the corrosion tests shown by way of example hereinafter were carried out with aqueous phosphoric acid solutions having concentrations of about 75 weight percent of the acid.

The herein inhibitor compositions contain as essential ingredients alkyl trimethyl ammonium chlorides and dialkyl dimethyl ammonium chlorides, in which the alkyl groups have 8 to 18 carbon atoms, and preferably 10 to 14 carbon atoms. Both of these materials are available commercially, commonly carried in inactive ingredients such as water or mixtures of water with alcohols such as isopropanol. Normally they are available as mixtures within the indicated classes, being prepared from naturally occurring oils which are mixtures of fatty esters. A typical case is dicoco dimethyl ammonium chloride which is based on coconut oil, and therefore contains as percent of total of alkyl groups, approximately 47% of dodecyl, 18% of tetradecyl, 10% of octadecyl, 9% of decyl and 8% of each of octyl and hexadecyl groups.

They are non-toxic, in contrast to most inhibitors, and thus are particularly useful in fertilizer and animal feed applications. When either alkyl trimethyl or dialkyl dimethyl ammonium chlorides are employed without the other, they have an inhibiting effect on concentrated phosphoric acid solutions. However, when they are not used together they either are not sufficiently active in inhibiting ability to make it practical to use the liquid systems wth mild steel equipment, or they are insufficiently compatible in the concentrated phosphoric acid or ammonium phosphate solutions to provide inhibition under conditions normally encountered in use.

Mixtures of these two ingredients are prepared to contain weight ratios on an active ingredient basis of about 1:3 to 3:1 of the dialkyl dimethyl ammonium chlorides to the alkyl trimethyl ammonium chlorides. The relative proportions of ingredients from the two classes may be varied within this range, and the particular proportions employed in a given application are determined on the basis of the system being inhibited and the particular alkyl ammonium chlorides used.

To obtain the maximum inhibiting effect, the mixture of these two inhibiting materials is employed in the amount of at least about 0.08 weight percent in the aqueous system being inhibited. Normally no more than about 0.25 weight percent of the mixture is used in the system, since use of more than this amount occasionally causes incompatibility of the inhibitor with the phosphorus-containing solution, and in any event is undesirable economically. Preferably no more than about 0.15% is employed. Use of less than about 0.08 weight percent of the mixture is possible, but does not provide the excellent corrosion inhibition provided with the preferred amount of 0.08 or more weight percent.

Additional ingredients may be employed together with the above synergistic inhibitor mixture. For example, amphoteric surface active agents, antifoam agents such as the commercial silicones, anti-pitting agents and additional agents such as propargyl alcohol, isoproply alcohol and the like may be employed.

The ingredients of the synergistic inhibition mixture preferably are predissolved, normally with the aid of a solvent such as water or an alcohol such as propyl alcohol, and added in this form to the concentrated phosphoric acid or ammonium phosphate aqueous solution with stirring to form clear solutions. This ability to form clear solutions from which inhibitor does not separate is not evidenced when certain of the inhibitor ingredients are employed in the absence of others.

The following examples are given only by way of illustration of the present invention and are not to be considered as limiting the scope thereof in any way.

EXAMPLES

Static corrosion test

Mild, cold-rolled steel specimens, 3″ x 1½″ x ⅛″ strips conforming to AISI 1018 specifications were cleaned by surface degreasing, acid pickling in 10% HCl and neutralization in $NaHCO_3$, after which they were rinsed with water and dried. They were then weighed to ±0.1 mg.

The prepared strips were then placed in beakers containing 490 g. of aqueous 75% phosphoric acid samples, containing inhibitors as noted in Table 1, which follows, held at 50° C. At the end of two days and seven days, the strips were removed, water rinsed, dried and weighed. The rates of corrosion during these two periods were determined in mils per year (m.p.y.). Calculations were carried out using the following formula:

If $W$=loss in weight (in grams) of the test piece during the time of immersion, $A$=area of test piece in square inches (9.0), $S$=density of the metal in grams per cubic centimeter (7.80), $T$=time of exposure in days, and m.p.y. =the rate of chemical corrosion expressed as mils penetration per year, then $$M.p.y. = \frac{1000 \times 365 \times W}{(2.54)^3 AST}$$

for this test, which is designated as the Static Corrosion Test in Table 1 which follows. A rate of corrosion of 50 m.p.y. would thus mean a metal loss of 0.316 g. during the period of 2 days.

Dynamic swirl corrosion test

Mild, AISI 1018 cold-rolled steel coupons measuring 3″ x 1½″ x ⅛″ and masked on their edges were cleaned by surface degreasing, acid pickling in 10% HCl and were neutralized in $NaHCO_3$, after which they were rinsed with water and dried. They were then weighed to ±0.1 mg.

The prepared strips were then placed in pint jars containing 397 g. of aqueous 75% phosphoric acid samples, containing inhibitors as noted in Table 1 which follows, held at 25° C. The jars were capped and placed on a No. 8914 A. H. Thomas Co. Laboratory Shaker, where they were shaken over 9 days in a fashion to provide alternate immersion and exposure of the coupons therein. The rates of corrosion were determined at the end of the 9 days of shaking, by removing the coupons, water washing them, drying them and determining their weight. Calculations were made using the above formula, to give the rates of corrosion in mils per year (m.p.y.).

The following table shows the results of a series of tests carried out by the static and dynamic test methods referred to above, employing each of the ingredients of the herein inhibitor mixtures alone, and employing varying proportions and concentrations of the mixtures. Table 1(a) shows examples of inhibitor mixtures of this invention employed in herein amounts, whereas Table 1(b) shows examples of unsatisfactory inhibitors, different from those of this invention either in having different compositions than those of this invention or in being used in amounts outside the herein ranges.

TABLE 1(a)

| Ex. | Inhibitor Component | Individual Component Conc.[1] | Total Component Conc.[1] | Static Corrosion Rate (m.p.y.) after— | | Dynamic Corrosion Rate (m.p.y.), 9 days | Compatibility with 75% H₃PO₄ | Compatibility with 8-24 Am. Ph.[2] |
|---|---|---|---|---|---|---|---|---|
| | | | | 2 days | 7 days | | | |
| 1 | Dicoco dimethyl ammonium chloride | 0.08 | 0.11 | 5 | 3 | | Yes | Yes. |
| | Predominantly dodecyl trimethyl ammonium chloride.[3] | 0.03 | | | | | | |
| 2 | Dicoco dimethyl ammonium chloride | 0.06 | 0.1 | 1 | 1 | | Yes | Yes. |
| | Predominantly dodecyl trimethyl ammonium chloride.[3] | 0.04 | | | | | | |
| 3 | Dicoco dimethyl ammonium chloride | 0.04 | 0.095 | 2 | 6 | | Yes | Yes. |
| | Predominantly dodecyl trimethyl ammonium chloride.[3] | 0.055 | | | | | | |
| 4 | Dicoco dimethyl ammonium chloride | 0.02 | 0.08 | 19 | 18 | | Yes | Yes. |
| | Predominantly dodecyl trimethyl ammonium chloride.[3] | 0.06 | | | | | | |
| 5 | Dicoco dimethyl ammonium chloride | 0.08 | 0.135 | <1 | <1 | | Yes | Yes. |
| | Predominantly dodecyl trimethyl ammonium chloride.[3] | 0.055 | | | | | | |
| 6 | Dicoco dimethyl ammonium chloride | 0.06 | 0.1 | | | 22 | Yes | Yes. |
| | Predominantly dodecyl trimethyl ammonium chloride.[3] | 0.04 | | | | | | |

TABLE 1(b) (COMPARATIVE EXAMPLES)

| Ex. | Inhibitor Component | Individual Component Conc.[1] | Total Component Conc.[1] | Static Corrosion Rate (m.p.y.) after— | | Dynamic Corrosion Rate (m.p.y.), 9 days | Compatibility with 75% H₃PO₄ | Compatibility with 8-24 Am. Ph.[2] |
|---|---|---|---|---|---|---|---|---|
| | | | | 2 days | 7 days | | | |
| 7 | Dicoco dimethyl ammonium chloride | 0.08 | 0.08 | 40 | | | Yes | No. |
| 8 | Dicoco dimethyl ammonium chloride | 0.12 | | | | 50 | Yes | No. |
| 9 | Predominantly dodecyl trimethyl ammonium chloride.[3] | 0.095 | 0.095 | 47 | 160 | | Yes | Yes. |
| 10 | Predominantly dodecyl trimethyl ammonium chloride.[3] | 0.11 | 0.11 | | | 49 | Yes | Yes. |
| 11 | Dicoco dimethyl ammonium chloride | 0.14 | 0.155 | 1 | 1 | | Yes | No. |
| | Predominantly dodecyl trimethyl ammonium chloride.[3] | 0.015 | | | | | | |
| 12 | Dicoco dimethyl ammonium chloride | 0.04 | 0.07 | 22 | 24 | | Yes | Yes. |
| | Predominantly dodecyl trimethyl ammonium chloride.[3] | 0.03 | | | | | | |

[1] Percent by weight of active component in aqueous 75% phosphoric acid solution.
[2] An aqueous ammonium phosphate solution having an ammonium concentration of 8% expressed as nitrogen and a phosphorus concentration of 24% expressed as P₂O₅.
[3] Contains 90% dodecyl, 9% tetradecyl and 1% octadecenyl trimethyl ammonium chloride.

Dioctyl dimethyl ammonium chloride and dioctyl trimethyl ammonium chloride mixtures, ditetradecyl dimethyl ammonium chloride and tetradecyl trimethyl ammonium chloride mixtures and others within the herein proportions of ingredients provide corrosion inhibiting effects and compatibilities comparable to those shown in Examples 1 to 6 above. These examples demonstrate that the most corrosive of the herein aqueous phosphorus-containing solutions, namely 75% phosphoric acid aqueous solutions, are inhibited against corrosion of mild steel by the present synergistic inhibitor mixtures. They show further that these inhibitor mixtures are perfectly compatible both with this solution and a typical aqueous ammonium phosphate fertilizer solution. This highly desirable combination of properties is achieved only with the herein synergistic mixtures, and not with the individual components when the latter are used individually. Furthermore, it will be noted that extremely good inhibition against corrosion is achieved when at least about 0.08% or more of the synergistic inhibitor mixture is employed.

This combination of compatibility of the inhibitor with the phosphorus-containing solutions and inhibition of corrosion of mild steel by the solutions, as evidenced by the effect of the inhibitor on aqueous 75% phosphoric acid, is most important. The concentrated phosphoric acid and ammonium phosphate solutions must be shipped and stored over extended times, and must be useful practically with common mild steel equipment employed both by users of the concentrated acid and by those who mix this acid with other ingredients to provide such products as the liquid ammonium phosphate fertilizers. The acid therefore must be resistant to attack on mild steel if it is to be useful without serious damage to the equipment. At the same time, the inhibitor employed must not separate substantially from the acid or fertilizers produced therefrom, since such separation produces gummy or otherwise objectionable solids or viscous liquids which clog and coat equipment. The present synergistic inhibitor mixture makes it possible to employ inexpensive mild steel equipment for mixing, storage and transport of concentrated phosphoric acid and fertilizers produced therefrom, without fear of excessive corrosion or separation of inhibitor from the acid or the fertilizer product.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that within the scope of the appended claims, the invention may be practiced by those skilled in the art, and having the benefit of this disclosure, otherwise than as specifically described and exemplified herein.

We claim:
1. Aqueous phosphorus-containing solution resistant to separation of components and inhibited against corrosion of mild steel, said aqueous solution having a phosphorus-containing ingredient from the group consisting of concentrated phosphoric acid and an ammonium phosphate, and essentially containing as an inhibitor against said corrosion a mixture of (a) a dialkyl dimethyl ammonium chloride in which the alkyl groups have 8 to 18 carbon atoms, and (b) an alkyl trimethyl ammonium chloride in which the alkyl groups have 8 to 18 carbon atoms, in the relative proportions of 1:3 to 3:1 of (a) to (b), said mixture being present in an amount of 0.08 to 0.25 percent by weight of the solution.

2. Solution of claim 1 in which the alkyl groups in the alkyl trimethyl and dialkyl dimethyl ammonium chlorides have 10 to 14 carbon atoms.

3. Solution of claim 1 in which the dialkyl dimethyl ammonium chloride is dicoco dimethyl ammonium chloride and the alkyl trimethyl ammonium chloride is composed of 90% of dodecyl trimethyl ammonium chloride, 9% of tetradecyl trimethyl ammonium chloride and 1% of octadecenyl trimethyl ammonium chloride.

4. Solution of claim 1 in which the inhibitor mixture is present in an amount of 0.08 to 0.15% by weight of the solution.

5. Method of inhibiting an aqueous phosphorus-containing solution from the group consisting of aqueous concentrated phosphoric acid solutions and aqueous ammonium phosphate solutions by incorporating in said solution as an inhibitor a mixture of (a) a dialkyl dimethyl ammonium chloride in which the alkyl groups have 8 to 18 carbon atoms and (b) an alkyl trimethyl ammonium chloride in which the alkyl groups have 8 to 18 carbon atoms, in the relative proportions of 1:3 to 3:1 of (a) to (b), said mixture being present in an amount of 0.08 to 0.25 percent by weight of the solution.

6. Method of claim 5 in which the alkyl groups in the alkyl trimethyl and dialkyl dimethyl ammonium chlorides have 10 to 14 carbon atoms.

7. Method of claim 5 in which the dialkyl dimethyl ammonium chloride is dicoco dimethyl ammonium chloride and the alkyl trimethyl ammonium chloride is composed of 90% of dodecyl trimethyl ammonium chloride, 9% of tetradecyl trimethyl ammonium chloride and 1% of octadecenyl trimethyl ammonium chloride.

8. Method of claim 5 in which the inhibitor mixture is incorporated in the solution in an amount of 0.08 to 0.15% by weight of the solution.

9. Composition for inhibiting an aqueous phosphorus-containing solution from the group consisting of concentrated aqueous phosphoric acid solutions and aqueous ammonium phosphate solutions against corrosion of mild steel, said composition essentially containing (a) a dialkyl dimethyl ammonium chloride in which the alkyl groups have 8 to 18 carbon atoms, and (b) an alkyl trimethyl ammonium chloride in which the alkyl groups have 8 to 18 carbon atoms, in the relative proportions by weight of 1:3 to 3:1 of (a) to (b).

10. Composition of claim 9 in which the alkyl groups in the alkyl trimethyl and dialkyl dimethyl ammonium chlorides have 10 to 14 carbon atoms.

11. Composition of claim 9 in which the dialkyl dimethyl ammonium chloride is dicoco dimethyl ammonium chloride and the alkyl trimethyl ammonium chloride is composed of 90% of dodecyl trimethyl ammonium chloride, 9% of tetradecyl trimethyl ammonium chloride and 1% of octadecenyl trimethyl ammonium chloride.

References Cited
UNITED STATES PATENTS

| | | | |
|---|---|---|---|
| 1,809,041 | 6/1931 | Jenkins et al. | 23—165 |
| 2,006,216 | 6/1935 | MacArthur et al. | 252—148 |
| 2,229,024 | 1/1941 | Bruson | 252—148 |
| 2,403,153 | 7/1946 | Saukaitis | 252—149 |
| 2,459,119 | 1/1949 | Rucker | 23—165 |
| 2,567,156 | 9/1951 | Malowan | 23—165 |
| 2,999,811 | 9/1961 | Schell et al. | 252—388 |
| 3,063,790 | 11/1962 | Pollitzer | 252—388 |

OSCAR R. VERTIZ, *Primary Examiner.*

O. F. CRUTCHFIELD, *Assistant Examiner.*